United States Patent
Akagi et al.

[19]

[11] Patent Number: 5,808,367
[45] Date of Patent: Sep. 15, 1998

[54] CONTROL SYSTEM FOR VEHICLE GENERATOR AND CONTROL METHOD THEREFOR

[75] Inventors: Yoshihiko Akagi, Mito; Masakatsu Fujishita, Ibaraki, both of Japan

[73] Assignees: Hitachi, Ltd.; Hitachi Car Engineering Co., Ltd., both of Japan

[21] Appl. No.: 750,505

[22] PCT Filed: Apr. 11, 1996

[86] PCT No.: PCT/JP96/00999

§ 371 Date: Dec. 11, 1996

§ 102(e) Date: Dec. 11, 1996

[87] PCT Pub. No.: WO96/32578

PCT Pub. Date: Oct. 17, 1996

[30] Foreign Application Priority Data

Apr. 11, 1995 [JP] Japan .................................. 7-085199

[51] Int. Cl.[6] .................................................. H02P 9/04
[52] U.S. Cl. ........................... 290/40 C; 322/29; 322/28; 123/339
[58] Field of Search .............................. 290/40 A, 40 B, 290/40 C, 40 R; 322/28, 29; 123/339

[56] References Cited

U.S. PATENT DOCUMENTS

| | | | |
|---|---|---|---|
| 4,919,096 | 4/1990 | Manaka et al. | 123/399 |
| 4,951,627 | 8/1990 | Watanabe et al. | 123/339 |
| 5,256,959 | 10/1993 | Nagano et al. | 123/339 |
| 5,263,447 | 11/1993 | Fujimoto | 123/339 |
| 5,545,928 | 8/1996 | Kotani | 290/40 C |
| 5,592,918 | 1/1997 | Suzuki et al. | 123/339.18 |
| 5,623,903 | 4/1997 | Ueda | 123/339.23 |
| 5,685,285 | 11/1997 | Ohtani et al. | 123/698 |
| 5,703,410 | 12/1997 | Maekawa | 290/40 C |

FOREIGN PATENT DOCUMENTS

| | | |
|---|---|---|
| A-59-86431 | 4/1984 | Japan . |
| A-59-103935 | 6/1984 | Japan . |
| A-59-128943 | 7/1984 | Japan . |
| A-59-211741 | 11/1984 | Japan . |
| A-59-229030 | 12/1984 | Japan . |
| A-62-7339 | 1/1987 | Japan . |
| B-1-39306 | 8/1989 | Japan . |
| A-1-277650 | 11/1989 | Japan . |
| A-2-241399 | 9/1990 | Japan . |
| U-3-127458 | 12/1991 | Japan . |
| A-4-133700 | 5/1992 | Japan . |
| A-5-180047 | 7/1993 | Japan . |
| A-5-180055 | 7/1993 | Japan . |
| A-6-22468 | 1/1994 | Japan . |
| A-6-117288 | 4/1994 | Japan . |
| A-6-197472 | 7/1994 | Japan . |
| A-7-227047 | 8/1995 | Japan . |
| A-8-74619 | 3/1996 | Japan . |

OTHER PUBLICATIONS

Japanese Search Report, Jul. 9, 1996.

*Primary Examiner*—Thomas M. Dougherty
*Assistant Examiner*—Nicholas Ponomarenko
*Attorney, Agent, or Firm*—Evenson, McKeown, Edwards & Lenahan, P.L.L.C.

[57] ABSTRACT

A method for controlling a vehicle generator, by obtaining a first correction volume of an opening of an ISC valve (ISCPI) based on a deviation of a rotation number of an internal combustion engine from a target rotation number, obtaining a driving volume of an excitation coil of a generator based on a deviation of a battery voltage from a target voltage, and obtaining a second correction volume of an opening of the ISC valve (EL) that takes account of an electrical load variation based on a driving volume of the excitation coil and a rotation number of the internal combustion engine, to obtain a driving volume of the ISC valve (ISCDTY) based on the first and second correction volumes of the opening of the ISC valve.

28 Claims, 12 Drawing Sheets

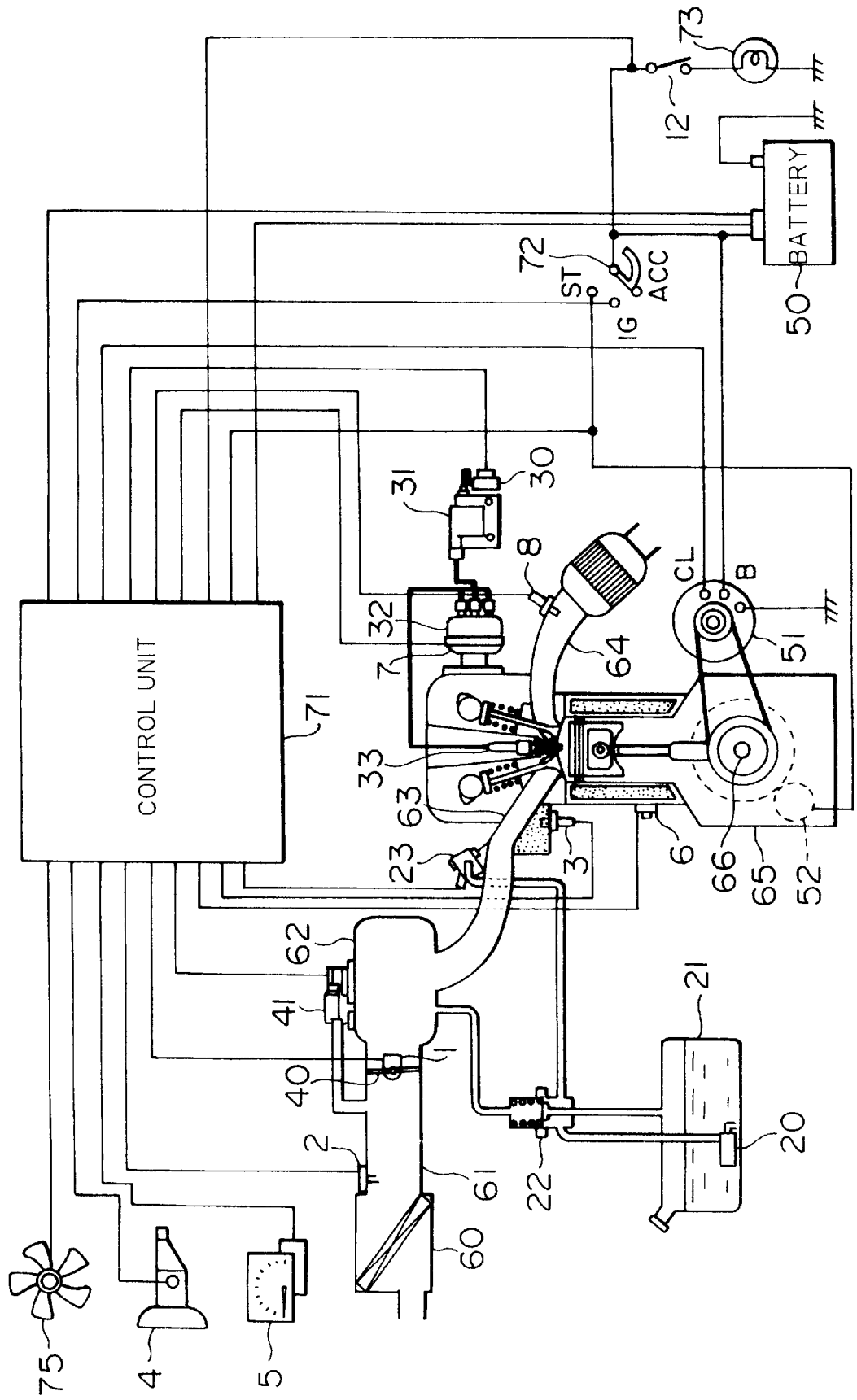
FIG. IA

| IDLE SWITCH | ENGINE ROTATION NUMBER | HEAD LAMPS | LIMIT VALUE OF SPEED OF CHANGING EXCITATION COIL DRIVING VOLUME |
|---|---|---|---|
| ON | AT LEAST NCLRC | ON | LARGE |
| | | OFF | LARGE |
| | LESS THAN NCLRC | ON | MEDIUM |
| | | OFF | SMALL |
| OFF | — | — | LARGE |

FRONT SIDE

CONTROL SYSTEM FOR VEHICLE GENERATOR AND CONTROL METHOD THEREFOR

TECHNICAL FIELD

In a control system for a vehicle generator for generating power driven to rotate by an internal combustion engine mounted on a vehicle, the present invention provides a control system for the vehicle generator and a control method therefor having no variation in the rotation of the internal combustion engine due to an electrical load during an engine idling period or having no drop in the speed of rotation of the internal combustion engine at the time of a sudden change in driving conditions such as a change from a racing to an idling status or a change from a deceleration to an idling status, by achieving an optimum power generation which matches a driving status of the internal combustion engine as well as by supplying an optimum quantity of auxiliary air.

BACKGROUND ART

The control of a vehicle AC generator for performing a power generation operation driven to rotate by an internal combustion engine mounted on a vehicle has so far been achieved generally by a control unit called an IC regulator. The IC regulator controls a voltage of a vehicle battery charged by an output of the generator to a predetermined level by detecting the voltage of the vehicle battery.

The Patent Gazette of the Japanese Patent Post-exam Publication No. 1-39306 discloses a unit for controlling a volume of a current flowing through an excitation coil by ON/OFF controlling a switch incorporated in the generator by sending a control signal of a micro-computer through a signal line.

Further, according to the Japanese Patent Laid-open Publication No. JP-A-59-103935, an adjustment of the rotation number of the internal combustion engine is carried out by co-operation of a generator control unit for controlling a generation volume of a generator according to the rotation number and an ISC valve control unit. As a method for detecting an electrical load, ON/OFF of a switch of a specific electrical load has been detected through a wiring.

Among the above-described control units of a generator mounted on a vehicle according to the prior-art technique, the control unit using an IC regulator has a power generation function by itself and, therefore, has a merit of high generality. On the other hand, this control unit lowers the response of the power generation volume against variations in the electrical load. Accordingly, this control unit has a problem in that this has a low degree of freedom since the responsiveness of a load response control and a control range of variable voltage control have to be dependent on the hardware when carrying out a load response control for slowing the engine load variations and a variable voltage control for generating power based on an output voltage indication signal generated from the internal combustion engine control unit. There is also a problem of high costs since the generator also has a control unit. In the example of the Japanese Patent Post-exam Publication No. 1-39306, the relation between the control of the generator and the control of the internal combustion engine is unclear. Further, in the case of the Japanese Patent laid-open Publication No. JP-A-59-103935, it is possible to control the rotation number of the engine by an overall control of the generation operation by taking in an operational tire electrical load status. However, since a target voltage value is simply changed over by a control unit and an actual load is not taken into account as a method for controlling the power generation operation of the generator, the improvement in power performance of the internal combustion engine and the effect of reduction in fuel consumption are not sufficient. Further, it is not possible to obtain sufficient effect against rotation variations at time of variations in electrical load. Since the generator also has a control unit, there is a problem of a high cost. Further, since no consideration is given to the ON/OFF status of the head lamps, there is a problem that variations in the illuminance of the head lamps occur due to voltage variations arising from the load response control.

DISCLOSURE OF INVENTION

When an electrical load suddenly becomes larger in a vehicle, the output of the internal combustion engine is lowered. This results in an unstable rotation number of the internal combustion engine during an idling period.

Therefore, it is necessary to stabilize the rotation number of the internal combustion engine by adjusting the ISC valve and an electronically controlled throttle valve.

It is an object of the present invention to provide a control system for a generator of a vehicle and a control method therefor for correcting a target voltage value to be changed over based on a vehicle status and an electrical load status, obtaining a sufficient effect of an improvement in power performance of the internal combustion engine and an improvement in fuel consumption, and having sufficiently small variations in rotation at time of variations in the electrical load.

In order to solve the above-described problems, the present invention includes an internal combustion engine mounted on a vehicle, a driving status detecting unit for detecting a driving status such as a rotation number of the internal combustion engine, an opening of the throttle valve and a temperature of cooling water, an ISC valve for adjusting a quantity of air bypassing the throttle valve provided in an intake manifold of the internal combustion engine, or an actuator for directly controlling a throttle valve opening, a generator driven by the internal combustion engine for generating power, an excitation coil for controlling a volume of generation stored in the generator, an excitation coil driving circuit for driving the excitation coil, a battery to be charged with power generated by the generator, and a voltage detecting unit for detecting a voltage of the battery, wherein a target generation voltage is calculated according to the driving status of the internal combustion engine and / or a battery liquid temperature, the target generation voltage is compared with the battery voltage, and a driving volume of the excitation coil is changed with a control speed obtained from the driving status, the load status of the head lamps and the wiper and the driving volume of the excitation coil so that the battery voltage comes close to the target voltage, and a speed of increasing the driving volume of the excitation coil is set to be smaller than a maximum speed of decreasing to thereby minimize a reduction in the rotation of the internal combustion engine. A battery liquid temperature is estimated by a digital filtering such as a weighted averaging of values of a cooling water temperature of the internal combustion engine. At the starting time, an estimated value of the battery liquid temperature at the previous stop is compared with a current estimate value, and a lower value is adopted.

As a driving volume for the ISC valve or the actuator for directly controlling the throttle valve opening, a value according to the excitation coil driving volume and the driving status is set.

With the above-described structure, the degree of freedom of each control constant becomes high and it is possible to obtain an effect of an improvement in power performance of the internal combustion engine, a reduction in fuel consumption and a prevention of rotation variations during an idling period.

It is proposed to provide a control system for an internal combustion engine and a vehicle generator, at low cost with high reliability, that incorporates an excitation coil current ON/OFF unit of a voltage detecting system as a control unit at the time of a failure of an operating unit for increasing a target rotation number when a driving volume of the excitation coil is equal to or above a predetermined value.

In summary, the present invention has the following structure.

A structure having an easy generator control function at time of a failure of an operating unit, which can detect with high precision a size of an electrical load that varies each time when it is inputted and can control the rotation number of an engine with higher precision, without a provision of a special input terminal, stores a generator control function in an operating unit for controlling the engine, obtains a target generation voltage and an excitation coil control speed from a driving status of the engine, obtains a load correction volume of an ISC from a function of an excitation coil driving volume and an engine driving status, measures variations in a power source voltage at time of variations in the electrical load by a generator having a load response control, estimates an electrical load volume from a power source voltage variation volume and a variation time and corrects the target engine rotation number, and estimates a battery temperature by a digital filter processing of an engine water temperature.

The control system for an internal combustion engine and a generator of a vehicle according to the present invention changes a generation voltage and a generation volume response based on a driving status of the internal combustion engine and an electrical load status. This enables to achieve a control system for a vehicle generator which is low in cost, has high reliability, has small variations in the illuminance of the head lamps due to voltage variations, has high power performance of the internal combustion engine with high fuel consumption performance, and has a large prevention effect of rotation variations during an idling.

Further, according to the present invention, it becomes possible to abandon a wiring and an input circuit for detecting an electrical load, and this reduces cost of the engine control system. Further, since it becomes possible to detect an electrical load varying each time when a load is applied, the detection precision of the electrical load volume is improved and the load of the ISC control can be corrected by a suitable volume. Thus, a rotation variation of the engine due to a load variation can be corrected suitably without a delay to thereby restrict the rotation variation, while preventing an oscillation and hunting of the engine.

BRIEF DESCRIPTION OF DRAWINGS

FIG. 1A is a diagram for showing one embodiment of a system structure to which the present invention is applied.

BEST MODE FOR CARRYING OUT THE INVENTION

A control system for an internal combustion engine and a generator for a vehicle according to one embodiment of the present invention will be explained based on the attached drawings.

Figure 1B:
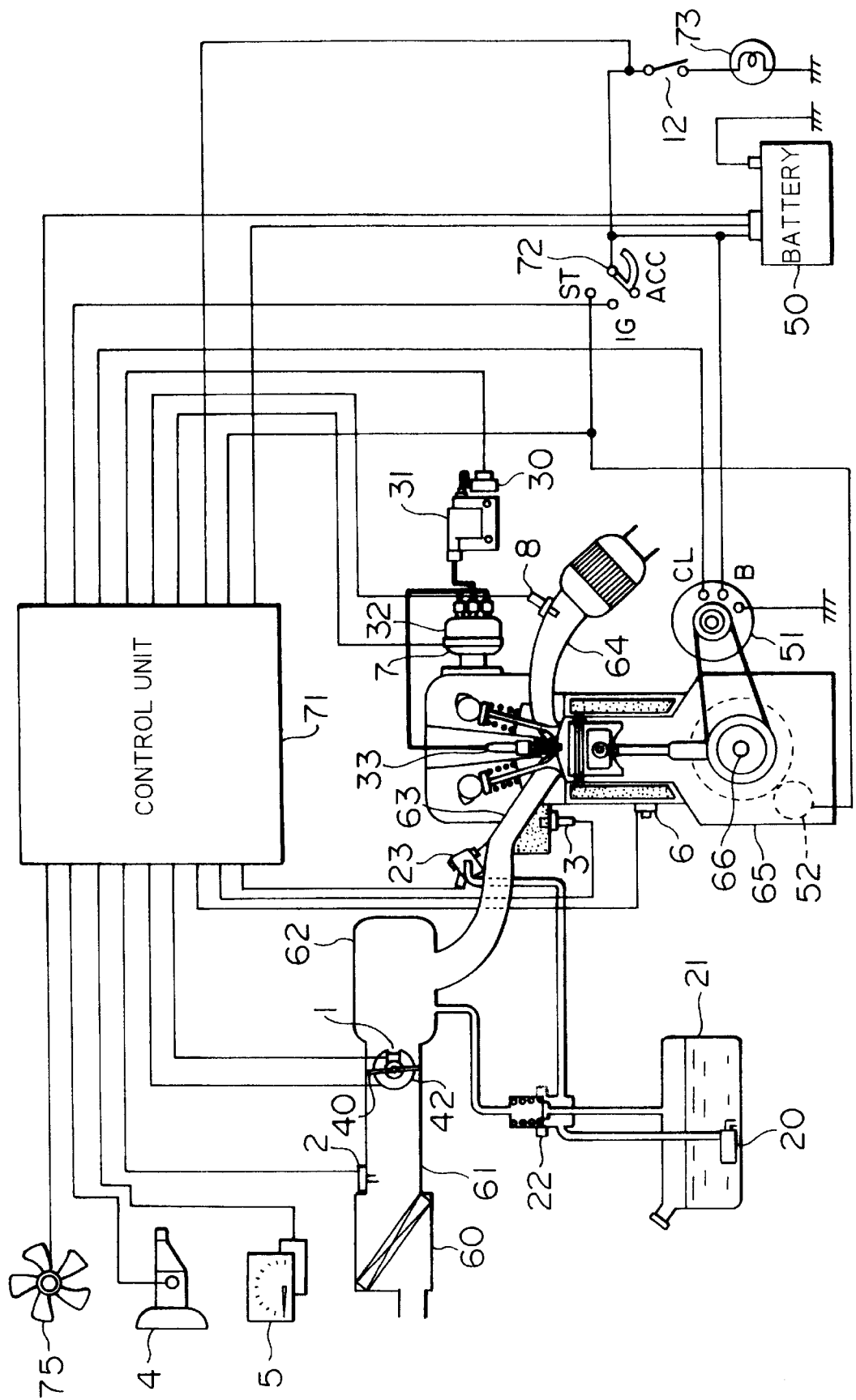
FIG. 1B is a diagram for showing another embodiment of a system structure to which the present invention is applied.

FIG. 1A and FIG. 1B show one embodiment respectively of the structure of a control system for an AC generator of a vehicle to which the present invention is applied. There is a difference between FIG. 1A and FIG. 1B in that FIG. 1B has an electronically controlled throttle valve for directly controlling an opening of a throttle valve 40 in place of an ISC valve 41 in FIG. 1A, and the rest of the structures are the same between FIG. 1A and FIG. 1B.

Figure 2:
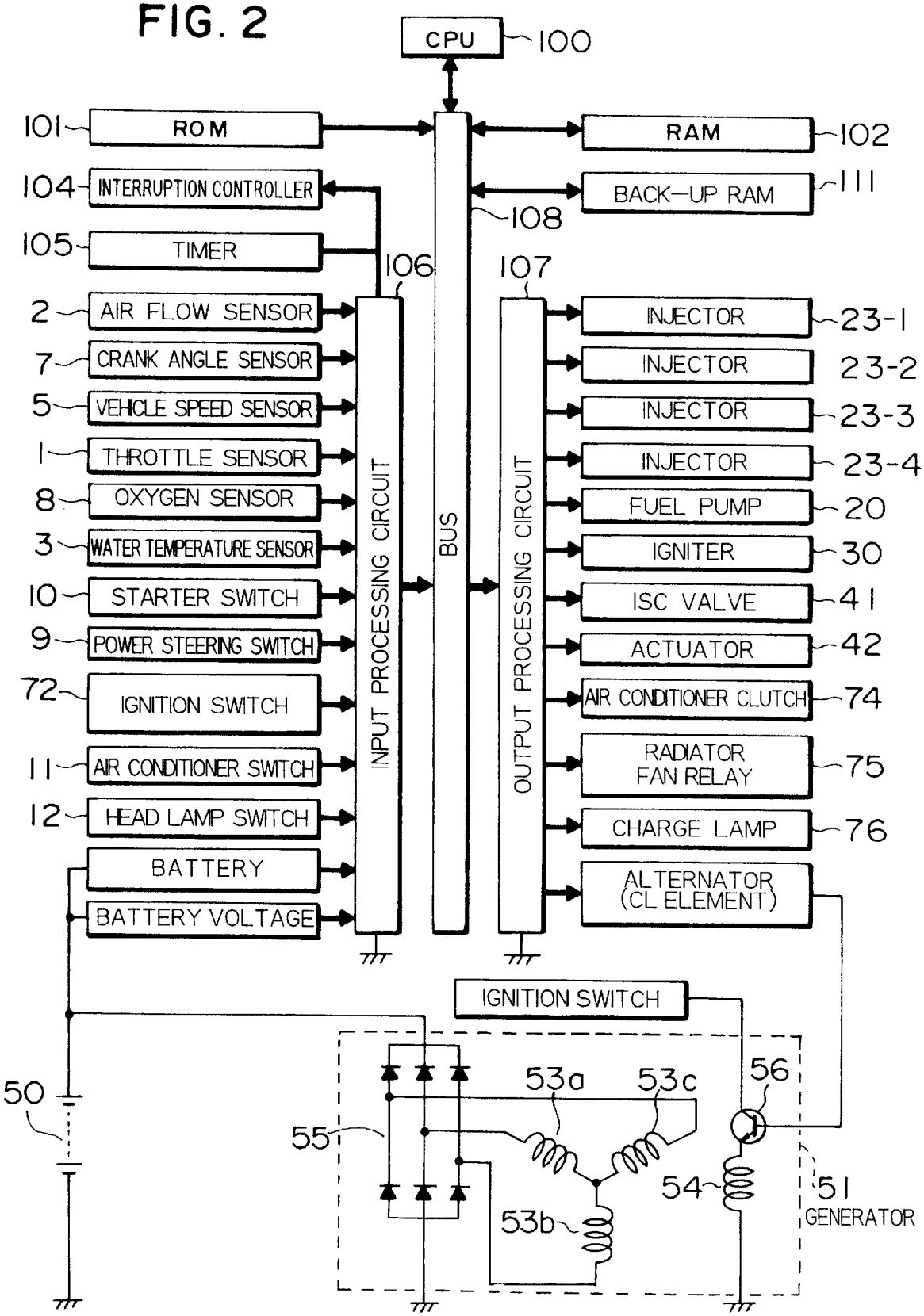
FIG. 2 is a structure diagram of a control system of an internal combustion engine for a vehicle and an AC generator.

FIG. 2 shows an overall structure of the control system for an internal combustion engine and an AC generator for a vehicle according to the present invention.

In FIG. 1A and FIG. 1B, an internal combustion engine 65 mounted on a vehicle such as an automobile has an output axis for outputting a rotation torque, that is, a crank shaft 66. A vehicle AC generator 51 is mechanically connected to the crank shaft 66 through a pulley or a belt.

The internal combustion engine 65 transmits its rotation torque to driving wheels through a transmission in the same manner as that of a general vehicle.

As one embodiment shown in FIG. 1A, a four-cylinder internal combustion engine of the so-called MPI (multi-point injection) system will be explained below.

For FIG. 1B, the explanation similar to that for FIG. 1A can be applied, except for the control method of the throttle valve 40.

Air is guided to an air flow meter 2 provided at an exit portion of an air cleaner 60. A hot-wire air flow sensor is used for the air flow meter 2. This air passes through a connected duct 61, a throttle body having the throttle valve 40 for controlling an air flow volume interlocked with an accelerator pedal operated by a driver, and the ISC valve 41 provided to bypass the throttle body for controlling the idling rotation number, and enters a collector 62. The air is distributed to each intake manifold 63 directly connected with the engine and is then absorbed into a cylinder.

A fuel is suctioned from a fuel tank 21 and pressured by a fuel pump 20, governed at a constant pressure by a pressure regulator 22, and injected within the intake manifold 63 from an injector 23 provided in the intake manifold 63.

A signal corresponding to the intake air quantity is outputted from the air flow meter 2. A pulse is outputted from a crank angle sensor 7 incorporated in a distributor 32 at each predetermined crank angle. These outputs are inputted to a control unit 71, and a crank angle and an engine rotation number are calculated. Further, a basic pulse width TP corresponding to a charging efficiency is obtained from the intake air quantity and the engine rotation number.

A throttle sensor 1 is fitted to the throttle valve 40 for detecting a valve opening, and a sensor signal is inputted to the control unit 71, to detect an opening and a fully closed position of the throttle valve 40 or to detect an acceleration.

A water temperature sensor 3 for detecting a temperature of a cooling water is fitted to the internal combustion engine 65, and a sensor signal is inputted to the control unit 71 to detect a warm-up status of the internal combustion engine 65, based on which an increase in a fuel injection volume, a correction of an ignition timing, an ON/OFF of a radiator fan 75, and a setting of a target rotation number during an idling are carried out.

An air-fuel ratio sensor 8 is fitted to an exhaust pipe for outputting a signal corresponding to an oxygen density of an exhaust gas. This signal is inputted to the control unit 71 to adjust a fuel injection pulse width to obtain a target A/F ratio.

4 denotes a neutral switch of the gear, 5 a car speed sensor, 30 an igniter, 31 an ignition coil, 33 an ignition plug, and 73 lights including the head lamps.

A control unit 71 is structured by a CPU 100 which is an operating unit, a ROM 101 which is a read only memory, a RAM 102 which is a readable and writable memory, a back-up RAM 111 of which content is not cleared even if the ignition key has been turned off, an interruption controller 104, a timer 105, an input processing circuit 106 and an output processing circuit 107. These units are all connected by a bus 108. The CPU 100 carries out a processing by using the back-up RAM 111 which can maintain the memory content even if the RAM 102 and the ignition key 72 are OFF, based on a program stored in the ROM 101 on basis of various information processed by the input processing circuit. In this case, an interruption processing is also carried out at an appropriate timing by an interruption instruction generated from the interruption controller 104 based on information from the timer 105 and the input processing circuit 106.

In FIG. 1B, the throttle valve 40 is controlled by an actuator 42 based on a driving signal from the control unit 71. A sensor 1 monitors an opening of the throttle valve 40 and feeds back an opening signal to the control unit 71 to control to obtain a target opening.

A power generating system will be explained below. The generator 51 is structured by a rotor with an excitation coil 54 wound around its periphery and a stator with three-phase windings 53a, 53b and 53c wound up to oppose the peripheral surface of the rotor, in the same manner as that for the conventional generator. The rotor is rotationally driven interlocked with the crank shaft 66 of the internal combustion engine 65. A rectifying circuit 55 formed with six diodes in series-parallel connection, for example, is connected to the three-phase windings 53a, 53b and 53c of the generator 51, so as to rectify a three-phase AC output of the generator 51 and supply this output to a vehicle battery 50 for charging this battery. The control unit 71 also incorporates a power generation control program for adjusting an output voltage of the generator so that a battery voltage comes close to a target generation voltage while detecting a voltage of the vehicle battery 50. Results obtained from the excitation coil driving circuit 56 for driving the excitation coil 54, the battery 50 to be charged by a power generated by the generator 51 and a voltage detecting unit for detecting the voltage of the battery 50, that is, the input processing circuit 106, are compared with results obtained by calculating a target generation voltage according to an operation status of the internal combustion engine and/or a battery liquid temperature. Then, a driving volume of the excitation coil 54 is calculated so that the voltage of the battery comes close to the target voltage, and a driving signal is outputted to the excitation coil driving circuit 56. The rotation number of the internal combustion engine is controlled by a driving volume of the ISC valve which is a sum of the driving volume of the ISC valve 41 and an electrical load correction volume obtained from the excitation coil driving volume and the operation status.

In the case of the actuator 42 in FIG. 1B, the ISC driving volume obtained in FIG. 1A is converted into an intake air quantity and a driving volume is obtained from the converted value to achieve the control.

Figure 3:
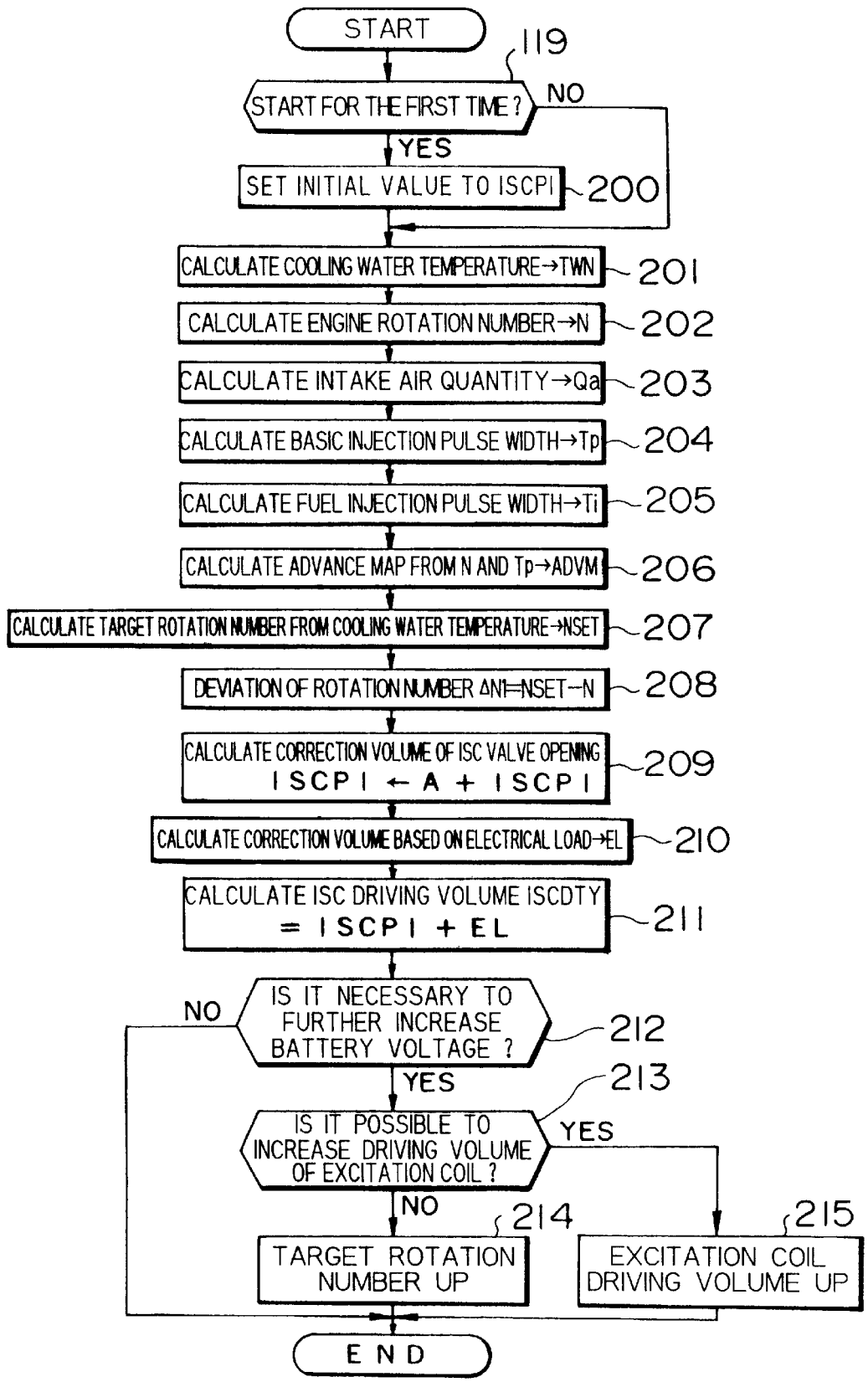
FIG. 3 is a flow chart for showing one embodiment of a control method for a vehicle generator according to the present invention.
Figure 4:
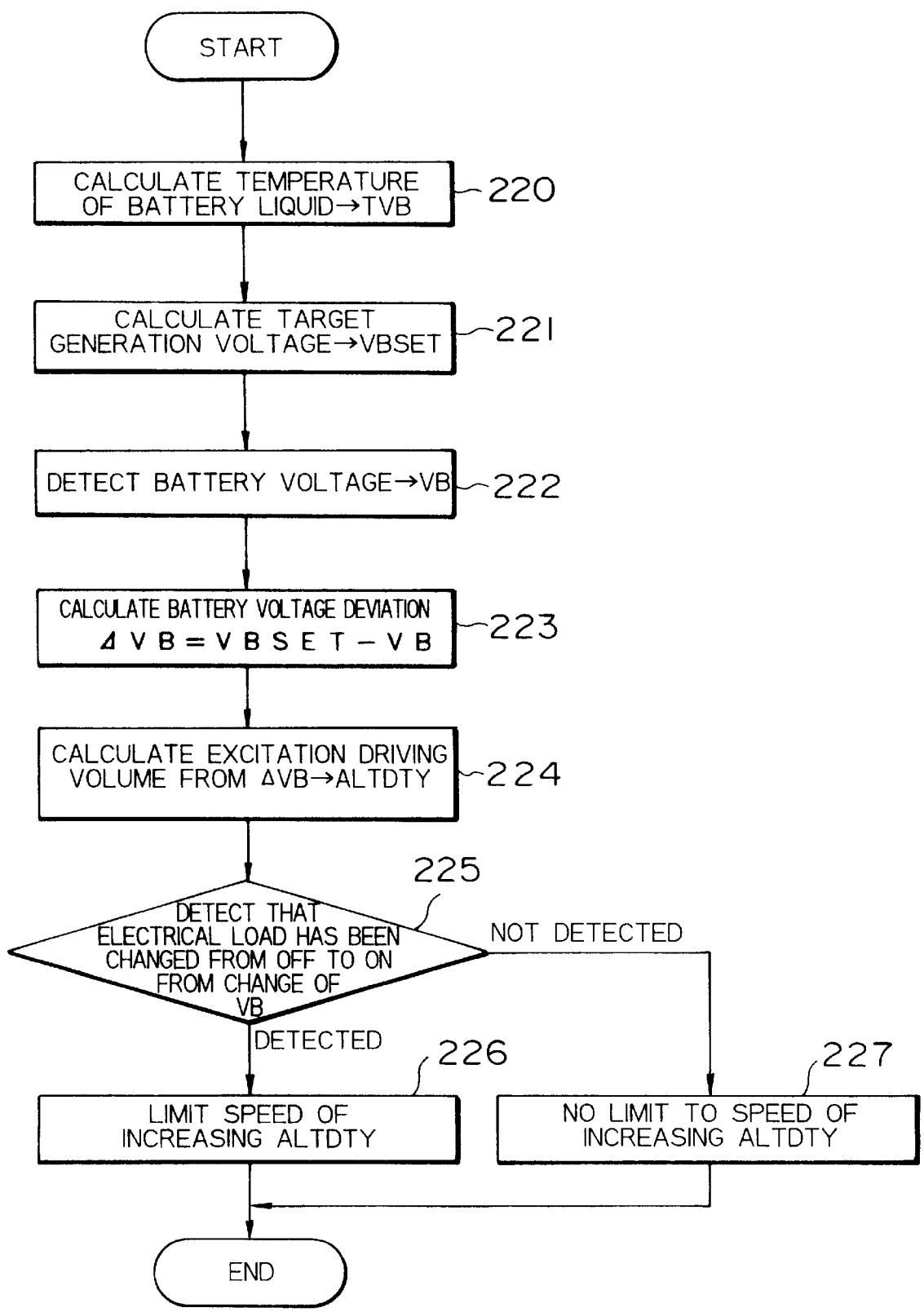
FIG. 4 is a flow chart for showing one embodiment of a control method for a vehicle generator according to the present invention which operates in parallel with FIG. 3.

FIGS. 3 and 4 show one embodiment of the flow chart for achieving the present invention by a program of a microcomputer.

The flow chart in FIG. 3 is started at a predetermined time, for example, at every 10 ms. At step 119, whether a program in FIG. 3 is started for the first time or not is checked. The answer is YES when the program is started for the first time after the key has been entered. In this case, an initial value is set to a first ISC valve opening correction volume ISCPI at step 200. This initial value is an opening of the ISC valve expressed in duty (%). 0% indicates a fully closed status and 100% indicates a completely open status. If the starting is not a first time, or if the starting is a second time or after since the program is repeatedly started at a predetermined interval, the result of the decision is NO. In this case, the process goes to step 201.

Figure 5:
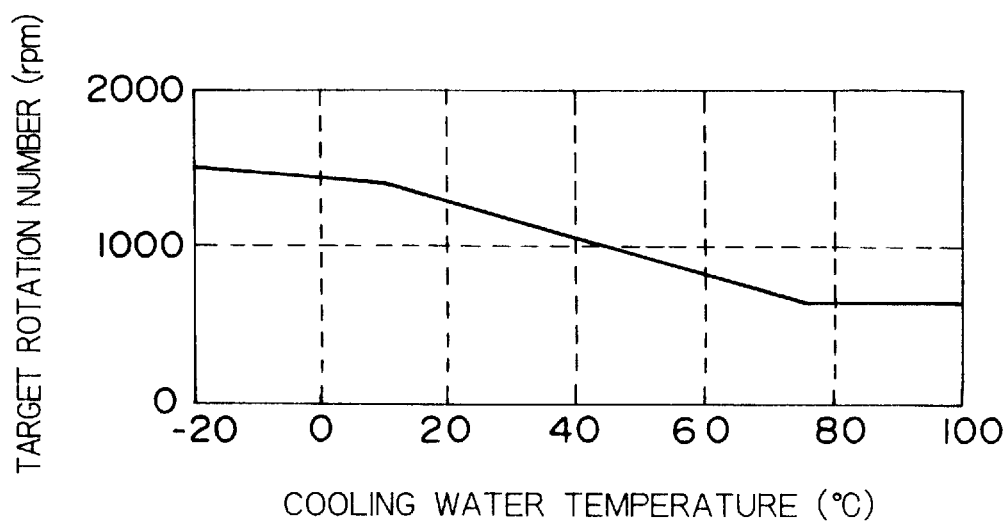
FIG. 5 is a table for showing a relation between a cooling water temperature and a target rotation number.

At step 201, a cooling water temperature TWN is calculated from an output value of the water temperature sensor, and at step 202 a rotation number N of the internal combustion engine is calculated. An intake air quantity $Qa$ is calculated at step 203, a basic injection pulse width $Tp$ is calculated at step 204, and a fuel injection pulse width $Ti$ is calculated at step 205. At step 206, an advance map is retrieved from the rotation number N of the internal combustion engine and the basic injection pulse width $Tp$, and a basic advance ADVM is calculated. At step 207, a target rotation number NSET corresponding to the cooling water temperature TWN is obtained from a table showing a relation between the cooling water temperature and the target rotation number shown in FIG. 5. At step 208, a deviation of an actual rotation number from the target rotation number NSET, $\Delta N1=NSET-N$, is obtained. When the deviation of the rotation number $\Delta N1$ is positive, the target rotation number NSET is higher than the actual rotation number N.

Figure 6:
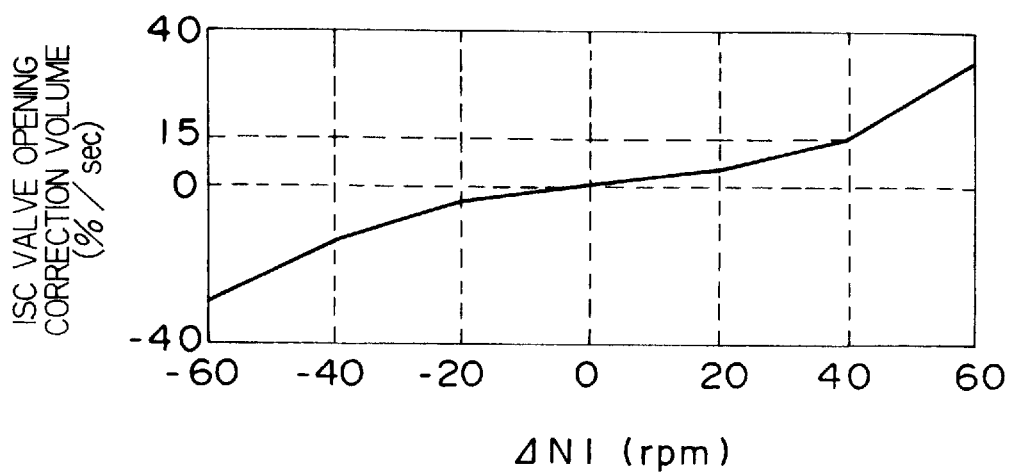
FIG. 6 is a table for showing a relation between a deviation of a rotation number and an ISC valve opening correction volume.

At step 209, the first ISC valve opening correction volume ISCPI based on the difference between the target rotation number and the actual rotation number is obtained. To be more specific, a correction volume A is obtained by referring to a table in FIG. 6 showing a relation between the deviation ΔN1 of the rotation number and the ISC valve opening correction volume, and ISCPI←A+ISCPI is set. The correction volume A is a change volume of the opening (duty) of the ISC valve per unit time, and is expressed in the unit of %/sec.

The table in FIG. 6 shows that when |ΔN1| is small, the opening of the ISC valve is changed gradually, and when |ΔN1| is large the ISC valve is changed quickly.

When the program starting interval is 10 ms, the initial value of the ISCPI set at step 119 is 50%, and the rotation number deviation ΔN1 is 40 (rpm), for example, the correction value A becomes 15 (%/sec.) from FIG. 6. Since the program starting interval is 10 ms, the correction volume A per 10 ms is 0.15%, and the first ISC valve opening correction volume ISCPI at the first starting time at step 209 becomes 50.15% which is a sum of the initial value 50% and the correction volume 0.15%. For the second starting time onward, the correction volume A is added to the ISCPI obtained at the time of the preceding program execution.

Figure 7:
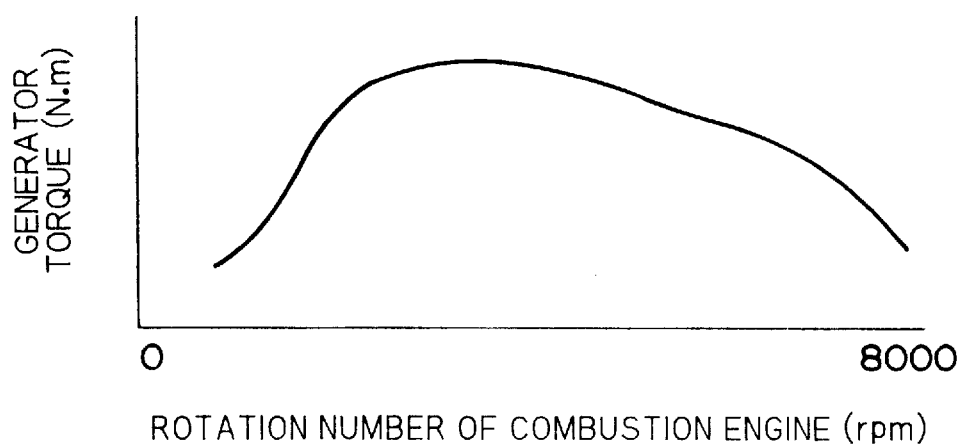
FIG. 7 is a table for showing a relation between a rotation number of the internal combustion engine and the torque of the generator.

At step 210, a second ISC valve opening correction volume EL based on the electrical load is obtained from the following expression.

$$EL = K \times Duty \times B \times N$$

where, Duty represents an excitation coil driving volume ALTDTY obtained from FIG. 4. K represents a conversion coefficient and B represents a value obtained from the internal combustion engine rotation number N and a load characteristic curve of the generator. In this embodiment, this value is a torque of the generator obtained from a characteristic diagram for showing the rotation number N of the internal combustion engine and torque characteristics of the generator shown in FIG. 7.

At step 211, an ISC valve driving volume ISCDTY is obtained from the following expression.

$$ISCDTY = ISCPI + EL$$

In other words, a value taking account of a correction volume based on the rotation number N of the internal combustion engine and a correction volume based on an estimated electrical load volume is set as the ISC valve driving volume. This ISC valve driving volume ISCDTY is not an absolute value but a relative value. Namely, the ISC valve driving volume ISCDTY is corrected so that the rotation number deviation ΔN1 becomes zero each time when the program is started.

At step 212, whether it has become necessary to raise the battery voltage further or not is checked. When it has become necessary to raise the battery voltage further, it is checked at step 213 whether it is possible to raise the excitation coil driving volume or not. When the excitation coil driving volume has already reached a maximum volume, for example, or when the generator is under a specific condition and the excitation coil driving volume cannot be raised to or above a predetermined value, the target rotation number NSET is set to a still higher value and the battery voltage is raised at step 214. When it is possible to raise the excitation coil driving volume, the excitation coil driving volume is raised at step 215.

When the program is to be applied to the system shown in FIG. 1B, the ISC valve driving volume ISCDTY in FIG. 3 is converted into an intake air quantity and the driving volume of the actuator 42 is determined based on a value of the converted intake air quantity. Alternatively, the first ISC valve opening correction volume ISCPI obtained at step 209 and the second ISC valve opening correction volume EL obtained at step 210 are converted into intake air quantities respectively and the driving volume of the actuator 42 is determined based on the respective converted intake air quantities.

FIG. 4 is a flow chart for limiting the speed of changing the driving volume of the excitation coil 54 of the generator 51, and this program operates in parallel with the flow chart shown in FIG. 3.

At step 220, a battery liquid temperature (TVB) is calculated from the cooling water temperature TWN obtained at step 201, according to a method shown in FIG. 17 to be explained later. At step 221, a target generation voltage VBSET is calculated from the battery liquid temperature (TVB) by referring to a table in FIG. 8.

Figure 8:
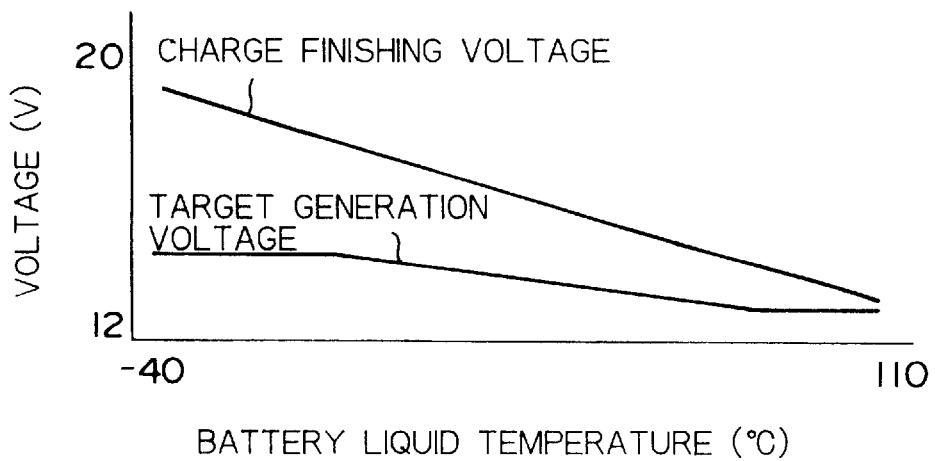
FIG. 8 is a table for showing a relation between a battery liquid temperature, a charge finishing voltage and a target generation voltage.

FIG. 8 shows a relation between a battery liquid temperature, a charge finishing voltage which is a voltage at the time of a completion of charging and a target generation voltage. When a battery liquid temperature is high, a charge finishing voltage is low, and therefore, it is necessary to correct a target voltage for feedback controlling the generator based on the battery liquid temperature. In the present invention, this correction is carried out based on the characteristic curve of the target generation voltage shown in FIG. 8.

At step 222, a battery voltage is detected, and at step 223, a deviation of the battery voltage from a target voltage, ΔVB=VBSET−VB is obtained.

Figures 9, 10:
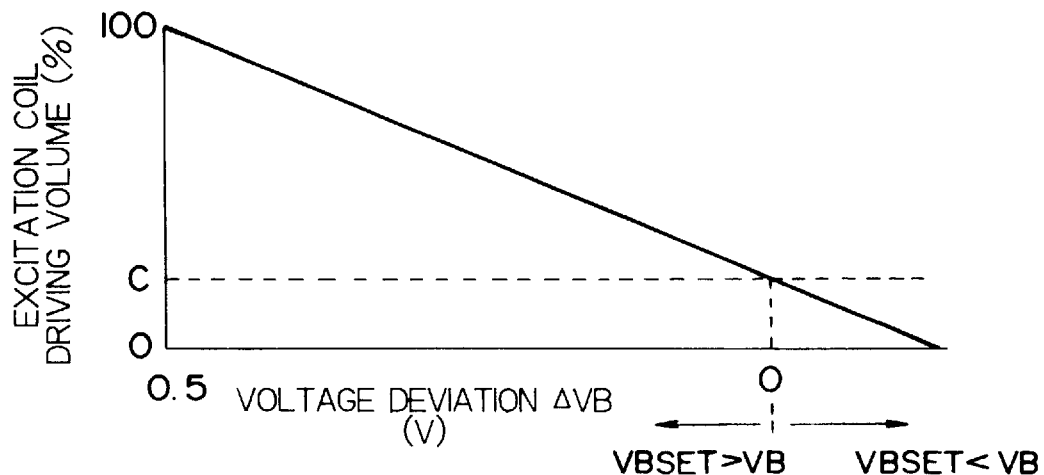
FIG. 9 is a table for showing a relation between a deviation of a battery voltage from a target value and a driving volume of an excitation coil.
FIG. 10 is a diagram for showing one embodiment of a method of setting driving volume of an excitation coil.

At step 224, the excitation coil driving volume ALTDTY is obtained by referring to the table for showing a relation between ΔVB and the excitation coil driving volume shown in FIG. 9. The excitation coil driving volume is controlled by a pulse width modulation and the ordinate of the table represents Duty of the pulse width in %.

In the table shown in FIG. 9, when a battery voltage is lower than a target voltage, the excitation coil driving volume is set to a large value. For example, when a battery voltage is lower than a target voltage by about 0.5 volt, Duty of the excitation coil driving volume is set to 100% to have a fast charging speed. When a battery voltage is higher than a target voltage, the excitation coil driving volume is set to a small value. For example, when a battery voltage is higher than a target voltage by about 0.15 volt, Duty of the excitation coil driving volume is set to 0% to stop the charging. Duty of the excitation coil driving volume between Duty 100% and 0% is obtained by a linear interpolation.

An excitation coil driving volume ALTDTY can also be obtained from the following expression.

$$ALTDTY = KI \times \Delta VB \times C$$

where, KI represents a conversion coefficient and C represents an offset volume of FIG. 9.

At step 225, when it is detected that the battery voltage has been lowered by at least a predetermined value, it is detected that the electrical load has been changed from OFF to ON. When it has been detected that the electrical load was changed from OFF to ON, at step 226, the speed of increasing the excitation coil driving volume ALTDTY is limited to be smaller than a maximum speed of decreasing the excitation coil driving volume. When a change of the electrical load from OFF to ON has not been detected, a limit is not set to the speed of increasing the excitation coil driving volume ALTDTY and the excitation coil of the generator is controlled by the excitation coil driving volume ALTDTY obtained at step 224 so that the battery voltage is made to come close to the target voltage.

With the above-described control, it becomes possible to charge a battery at a charging voltage suitable for the status of the battery, and thus it is possible to achieve an extension of a battery life and provide a generation control unit free from a drop in the rotation number of the internal combustion engine attributable to a sudden increase in the load torque at the time of applying an electrical load.

In this case, KI represents a conversion coefficient and C represents an offset volume of FIG. 9.

At step 225, when it is detected that the battery voltage has been lowered by at least a predetermined value, it is detected that the electrical load has been changed from OFF to ON. When it has been detected that the electrical load was changed from OFF to ON, at step 226, the speed of increasing the excitation coil driving volume ALTDTY is limited to be smaller than a maximum speed of decreasing the excitation coil driving volume. When a change of the electrical load from OFF to ON has not been detected, a limit is not set to the speed of increasing the excitation coil driving volume ALTDTY and the excitation coil of the generator is controlled by the excitation coil driving volume ALTDTY obtained at step 224 so that the battery voltage is made to come close to the target voltage.

At step 226, a limit is set to the speed of increasing the excitation coil driving volume ALTDTY. One embodiment is shown in FIG. 10.

A fully closed status is determined from an opening of the throttle valve 40 detected by the throttle sensor 1. When the throttle valve 40 is in the fully closed status and the rotation number of the internal combustion engine is at least a predetermined value (NCLRC), a control value of the speed change of the excitation coil driving volume is set to a large value so that the battery voltage comes closer to the target generation voltage and this does not give a sense of incongruity to a driver due to a variation in the illuminance of the head lamps during the running of a vehicle. When the throttle valve 40 is in the fully closed status, the rotation number of the internal combustion engine is less than a predetermined number (NCLRC) and the electrical load exceeds a predetermined value, that is, for example, when the head lamps are ON, the control value of the speed of changing the excitation coil driving volume is set to a medium value so that both a prevention of a rotation variation of the internal combustion engine and a prevention of a variation in the illuminance of the head lamps are achieved. Further, when the throttle valve 40 is in the fully closed status, the rotation number of the internal combustion engine is less than a predetermined number (NCLRC) and the electrical load is equal to or less than a predetermined value, that is, for example, when the head lamps are not ON, the control value of the speed of changing the excitation coil driving volume is set to a small value so that an effect of preventing a variation in the rotation of the internal combustion engine is increased. This NCLRC may also be defined as a fuel cut recover rotation number during a deceleration, for example.

The setting of the excitation coil driving volume in FIG. 10 can also be carried out independently.

With the above-described control, it becomes possible to charge a battery at a charging voltage suitable for the status of the battery, and thus it is possible to achieve an extension of a battery life and provide a generation control unit free from a drop in the rotation number of the internal combustion engine attributable to a sudden increase in the load torque at the time of applying an electrical load.

Figure 11:
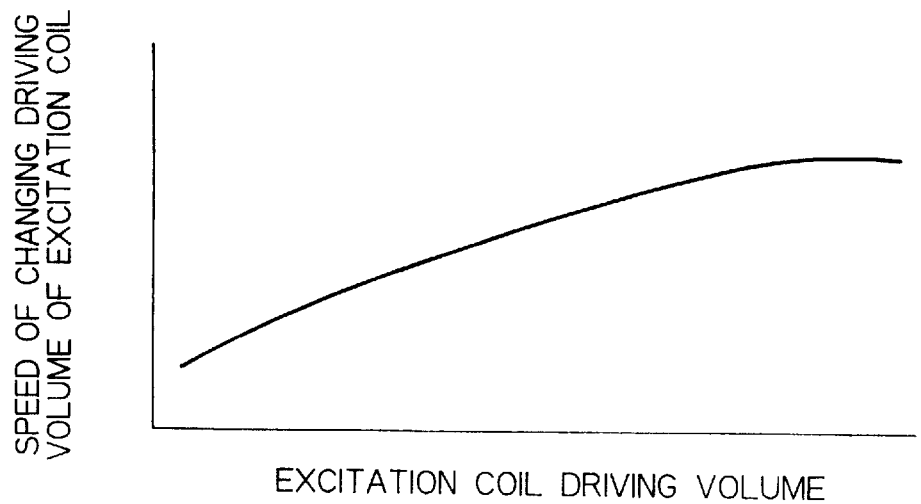
FIG. 11 is a characteristic diagram for showing a relation between driving volume of an excitation coil and change speed of driving volume of the excitation coil.

FIG. 11 shows one example of a relation between an excitation coil driving volume and a speed of changing the excitation coil driving volume. As the excitation coil driving volume becomes larger, the speed of changing the excitation coil driving volume becomes larger. Since a torque required to the engine becomes larger as the excitation coil driving volume becomes larger, the proportion of a torque variation generated by a variation in the electrical load to a total torque required to the generator becomes smaller, so that there is less variation in rotation and it becomes possible to increase the control speed.

Figure 12:
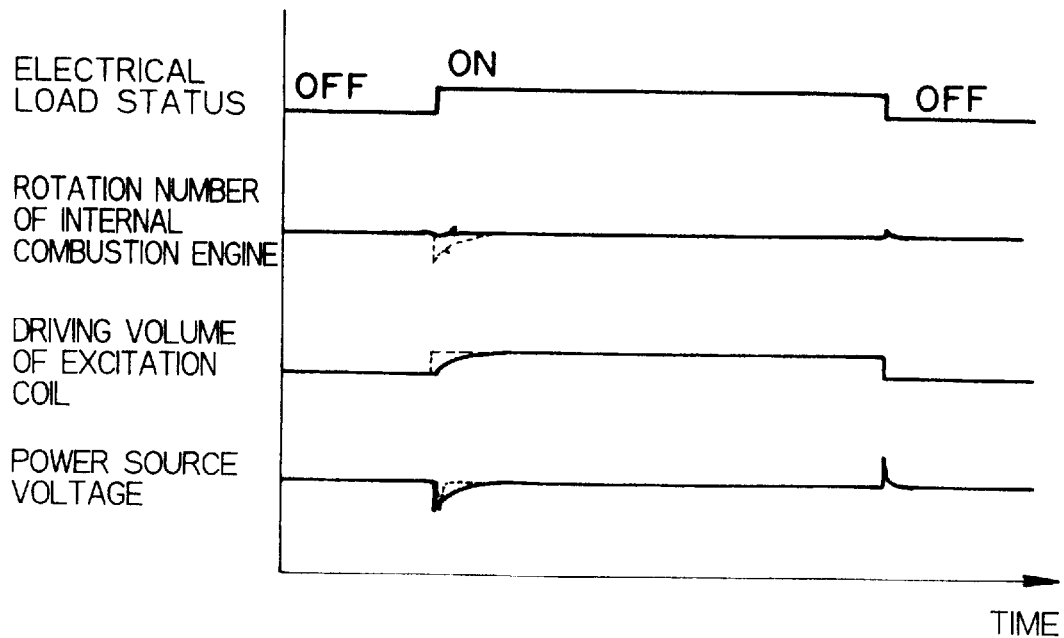
FIG. 12 is a diagram for explaining advantages of providing a limit to the speed of changing the driving volume of an excitation coil.

FIG. 12 is a diagram for showing an effect of restricting a speed of raising the excitation coil driving volume ALTDTY of the generator according to the program shown in FIG. 4. In this graph of the rotation number of the internal combustion engine, the excitation coil driving volume and the battery voltage, solid lines show characteristics of the case that there is an effect of a restriction in the speed of raising the excitation coil driving volume ALTDTY according to the present invention, and broken lines show characteristics according to the prior-art techniques.

When an electrical load has changed from OFF to ON, a driving torque of the generator (excitation coil driving volume) gradually changes because of a limit of the speed of raising the excitation coil driving volume ALTDTY, so that a reduction in the rotation of the internal combustion engine can be prevented. Further, since a rise in the battery is slow, the driver cannot easily notice a change in the illuminance of the head lamps and others. On the other hand, when the electrical load has changed from ON to OFF, a variation in the battery voltage is small and there is almost no rise in voltage and almost no change in illuminance.

Figure 13:
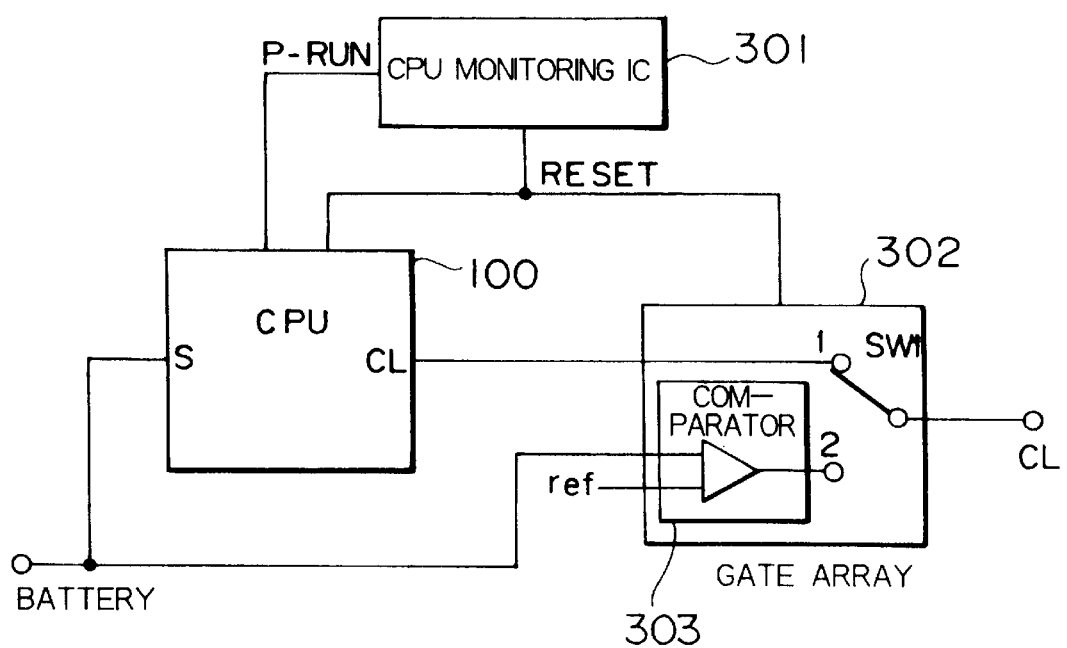
FIG. 13 is a diagram for showing one embodiment of a fail-safe circuit.

FIG. 13 shows one example of a fail-safe control unit to prepare for a time of a failure of the operating unit. This achieves a fail-safe function for controlling the generator when the operating unit 100 incorporated in the control unit 71 is in failure. When the operating unit 100 is in failure and P-RUN has not been detected for a predetermined time period, a CPU monitoring IC 301 outputs a reset signal. Based on this reset signal, a gate array 302 turns a SW1 from 1 to 2 to change over the system to a fail-safe circuit. When a battery voltage becomes a reference voltage (ref) or above, the fail-safe circuit stops a current conduction to a CL terminal performing a control of current conduction to the excitation coil, by a comparator 303. When the battery voltage becomes lower than the reference voltage (ref), the fail-safe circuit conducts a current to the CL terminal, thus achieving a function of controlling the generator.

FIGS. 14 to 17 are diagrams for explaining a method of estimating a battery liquid temperature.

Figure 14:
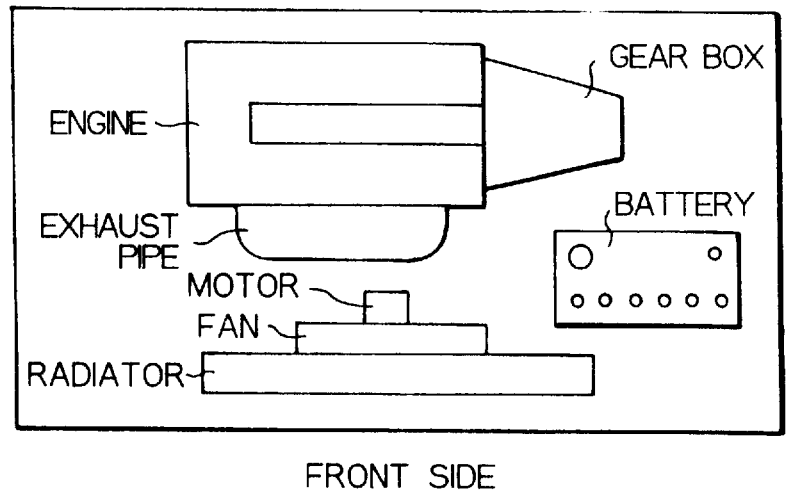
FIG. 14 is a layout diagram of an engine room.

FIG. 14 is a diagram for explaining one example of the layout of an engine room of a general vehicle. In a normal status, the temperature of a battery liquid rises due to the liquid being heated by a high-temperature air that has passed through a radiator and a heat of an exhaust pipe in addition to a self-heating by charging and discharging. In other words, before a warming up of the engine, the temperature of the battery liquid is near an open air temperature and is estimated to be a temperature close to a temperature of the cooling water liquid before the engine warm-up. On the other hand, after an engine warm-up, the cooling water temperature TWN rises suddenly to a level higher than a battery liquid temperature.

Figure 15:
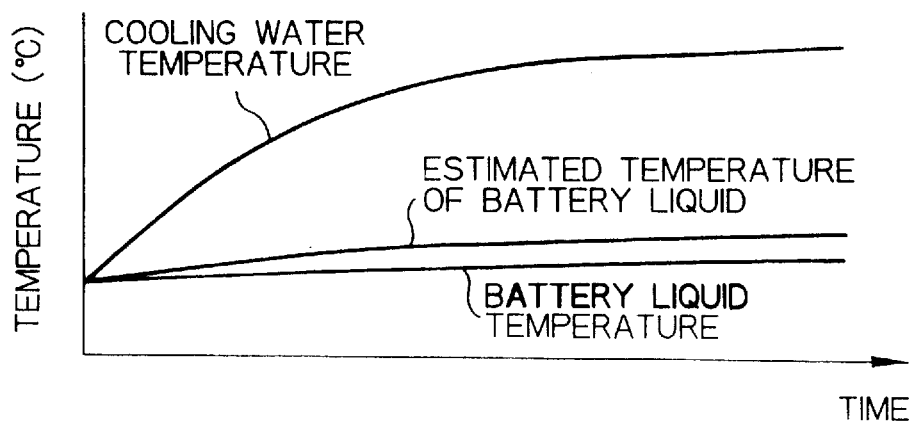
FIGS. 15 to 17 are diagrams for explaining a method of estimating a temperature of a battery liquid.
Figure 16:
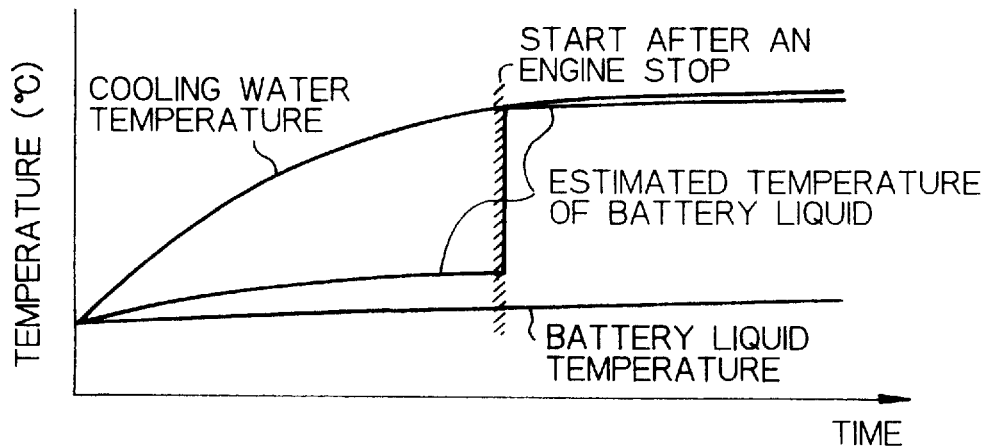

FIG. 15 is one example of a chart diagram for showing a change of a battery liquid temperature as compared with a change of a cooling water temperature. Cooling water temperature is sampled at every predetermined period and obtained values are weighted averaged, so that a battery liquid temperature is estimated with a delay characteristic with respect to a change in the rise of the cooling water temperature.

As a weighted average processing, a digital filtering processing is available, for example. FIG. 15 shows that when the cooling water temperature is simply weighted averaged, if the engine is started again before the engine has been cooled down after stopping the engine, there is a problem that the estimated temperature of the battery liquid becomes the cooling water temperature itself. This shows a problem that there is no delay characteristic so that the battery liquid temperature is deviated from the estimated value.

Figure 17:
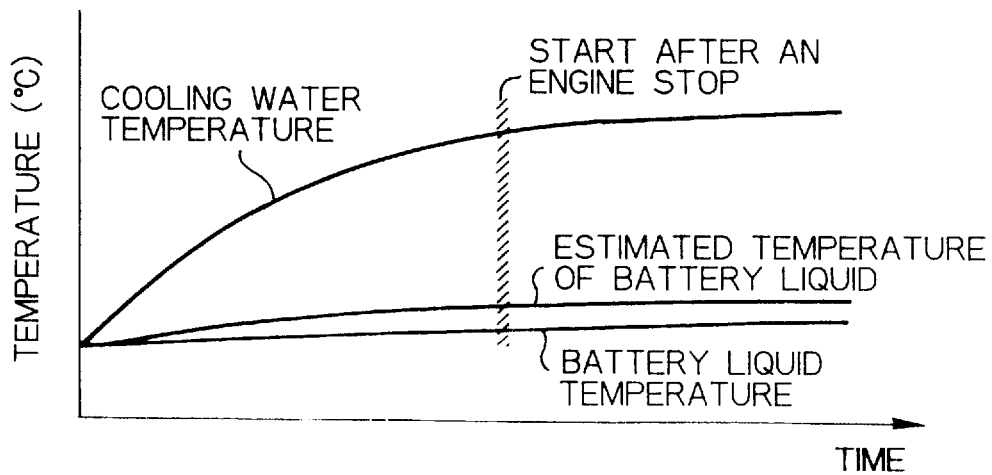

FIG. 17 shows a result of estimating a battery liquid temperature by storing an estimated temperature value of a battery liquid in a back-up RAM when the engine stopped, comparing this estimated value with a cooling water temperature at the time of starting the engine next time and selecting a lower value, and setting this selected value as an initial value of the estimated value. It is possible to improve the precision of the estimate according to this estimating method.

In the present invention, it is possible to carry out a charging with a high precision by determining a target generation voltage using a result of the estimation of the battery liquid temperature according to the method in FIG. 17 at steps 220 and 221 in FIG. 4.

In the above-described embodiments, the tables in FIGS. 5, 6, 7, 8 and 9 are registered in the memory in advance.

The present invention is not limited to the above-described embodiments but includes various modifications included in the scope of claim.

We claim:

1. A control system for a vehicle generator, comprising: an internal combustion engine mounted on a vehicle; an operating unit for controlling a driving of said internal combustion engine; driving status detecting means for detecting a driving status of said internal combustion engine by detecting at least a rotation number of said internal combustion engine, an opening of a throttle valve and a temperature of a cooling water; intake air quantity adjusting means for adjusting a quantity of an intake air during an idling; a generator driven by said internal combustion engine, for generating power; an excitation coil incorporated in said generator, for controlling a generation volume; means for driving said excitation coil; a battery to be charged by power generated by said generator; and means for detecting a voltage of said battery, wherein said operating unit includes:

means for setting a driving volume of said intake air quantity adjusting means;

means for calculating a target generation voltage according to a driving status of said internal combustion engine;

means for calculating driving volume (ALTDTY, 224) of said excitation coil so that a voltage of said battery comes close to said target generation voltage by comparing said target generation voltage with said battery voltage; and means for correcting a driving volume of said intake air quantity adjusting means by a first correction volume (ISCPI, 209) based on a rotation number of said internal combustion engine and a second correction volume (EL, 210) based on a driving volume of said excitation coil and said detected driving status.

2. A control system for a vehicle generator according to claim 1, wherein said means for correcting said intake air quantity adjusting means includes means (210) for multiplying a driving volume of said excitation coil with a value obtained from load characteristics of said internal combustion engine.

3. A control system for a vehicle generator according to claim 1, further including means (225, 226) for changing a speed of changing a driving volume of said excitation coil according to a detected driving status.

4. A control system for a vehicle generator according to claim 3, wherein said means for changing a speed of changing a driving volume of said excitation coil includes:

means (225) for detecting an electrical load status; and means (226) for changing a speed of changing a driving volume of said excitation coil based on said detected electrical load status.

5. A control system for a vehicle generator according to claim 3, wherein said means for changing a speed of changing a driving volume of said excitation coil includes means for setting a speed of increasing a driving volume of said excitation coil to be smaller than a maximum speed of decreasing a driving volume of said excitation coil.

6. A control system for a vehicle generator according to claim 1, further including:

failure detecting means (301) for detecting a failure of said operating unit; and auxiliary control means (302) for controlling said internal combustion engine in place of said operating unit when said failure detecting means detected a failure of said operating unit, and said auxiliary control means includes means (SW1) for interrupting a current of said excitation coil when a battery voltage has become a predetermined value or above.

7. A control system for a vehicle generator according to claim 1, further including:

means (212) for detecting whether it has become necessary to raise a voltage of said battery; and means (213, 214) for raising a voltage of said battery by increasing a target rotation number of said internal combustion engine when a driving volume of said excitation coil is at least a predetermined value at a time when it becomes necessary to raise a voltage of said battery.

8. A control system for a vehicle generator according to claim 1, wherein said means for calculating said target generation voltage includes:

means for sampling a temperature of a cooling water of said internal combustion engine at every predetermined time;

means for carrying out a weighted average processing of a result obtained by said sampling;

means for estimating a temperature of said battery liquid from a value obtained by said weighted average processing; and means (FIG. 8) for correcting said target generation voltage based on a relation between an estimated temperature of said battery liquid and a charging voltage.

9. A control system for a vehicle generator according to claim 8, wherein said means for estimating a temperature of said battery liquid includes:

means for comparing a current temperature of a cooling water of said internal combustion engine with a memory value of a cooling water temperature after a weighted average processing stored at a time when said internal combustion engine stopped; and means (FIG. 17) for setting a value whichever is lower as an estimated value of a battery liquid temperature at a starting time.

10. In a control system for a vehicle generator, comprising: an internal combustion engine mounted on a vehicle; an operating unit for controlling a driving of said internal combustion engine; intake air quantity adjusting means for adjusting a quantity of an intake air during an idling; a generator driven by said internal combustion engine, for generating power; an excitation coil incorporated in said generator, for controlling a generation volume; and a battery to be charged by power generated by said generator, a method for controlling a vehicle generator, including:

a step (202) for obtaining a rotation number N of said internal combustion engine;

a step (207) for obtaining a target rotation number NSET of said internal combustion engine from a temperature of a cooling water;

a step (208) for obtaining a rotation number deviation $\Delta N1 = NSET - N$;

a step (209) for setting a first correction volume of an intake air quantity during an idling based on said rotation number deviation $\Delta N1$;

a step (210) for setting a second correction volume (EL) of an intake air quantity during an idling based on an electrical load volume; and a step (211) for adjusting an intake air quantity during an idling based on said first and second correction volumes.

11. A control method according to claim 10, wherein said step for setting a first correction volume of an intake air quantity includes a step for setting said first correction volume by referring to a table (FIG. 6) for showing a relation between said rotation number deviation $\Delta N1$ and an adjusting volume of said intake air adjusting means during an idling.

12. A control method according to claim 10, further including:

a step (223) for detecting a voltage deviation between a target generation voltage and an actual battery voltage; and a step (224) for obtaining an excitation coil driving volume of a vehicle generator based on said voltage deviation, and said step for setting a second correction volume includes a step for obtaining said second correction volume based on said excitation coil driving volume obtained.

13. A control method according to claim 12, wherein said step for obtaining said second correction volume (EL) includes a step for obtaining said second correction volume based on the following expression:

a second correction volume = $K \times ALTDTY \times B \times N$ where, K represents a conversion coefficient, ALTDTY represents an excitation coil driving volume, B represents a value based on load characteristics of an internal combustion engine and N represents a rotation number of said internal combustion engine.

14. A control method according to claim 13, wherein said step for obtaining said second correction volume includes a step for obtaining a torque of a generator determined from a rotation number of an internal combustion engine as a value based on load characteristics of an internal combustion engine.

15. A control method according to claim 12, further including:

a step (225) for monitoring a driving status of an internal combustion engine; and a step (226) for controlling a speed of changing a driving volume of said excitation coil according to a driving status.

16. A control method according to claim 15, wherein said step for monitoring a driving status includes a step for monitoring a variation of an electrical load, and said step for controlling a speed of changing a driving volume of said excitation coil includes a step for limiting a speed of changing a driving volume of said excitation coil when a variation of said electrical load has exceeded a predetermined value and for controlling said excitation coil with an excitation coil driving volume obtained at said step for obtaining a driving volume of said excitation coil when a variation of said electrical load is not higher than a predetermined value.

17. A control method according to claim 15, wherein said step for monitoring a variation of an electrical load includes a step for detecting a variation of a battery voltage.

18. A control method according to claim 15, wherein said step for controlling a speed of changing a driving volume of said excitation coil includes a step for setting a speed of increasing a driving volume of said excitation coil to be smaller than a maximum speed of decreasing a driving volume of said excitation coil.

19. A control method according to claim 12, further including:

a step (212) for determining whether it is possible to increase a driving volume of said excitation coil when it becomes necessary to further raise a battery voltage; and steps (213, 214) for setting said target rotation number NSET to a higher value when it is not possible to increase a driving volume of said excitation coil.

20. A control method according to claim 12, wherein said step for detecting a voltage deviation of an actual battery voltage from a target generation voltage includes:

a step for sampling a temperature of a cooling water of said internal combustion engine at every predetermined time;

a step for carrying out a weighted average processing of a result obtained by said sampling;

a step (220) for estimating a temperature of said battery liquid from a value obtained by said weighted average processing; and a step (221) for determining said target generation voltage from said estimated temperature of a battery liquid.

21. A control method according to claim 20, wherein said step for estimating a temperature of a battery liquid includes:

a step comparing a current temperature of a cooling water of said internal combustion engine with a memory value of a cooling water temperature after a weighted average processing stored at a time when said internal combustion engine stopped; and a step (FIG. 17) for setting a value whichever is lower as a result of said comparison as an estimated value of a battery liquid temperature at a starting time.

22. In a control system for a vehicle generator, comprising: an internal combustion engine mounted on a vehicle; an operating unit for controlling a driving of said internal combustion engine; a generator driven by said internal combustion engine, for generating power; an excitation coil incorporated in said generator, for controlling a generation volume; and a battery to be charged by power generated by said generator, a method for controlling a vehicle generator, including:

- a step (220) for obtaining a battery liquid temperature;
- a step (221) for obtaining a target generation voltage of said generator based on a relation between a battery liquid temperature and a charge finishing voltage of said battery;
- a step (222) for detecting a battery voltage;
- a step (223) for obtaining a voltage deviation of said battery voltage from said target generation voltage; and
- a step (224) for obtaining a driving volume of said excitation coil of said generator from said voltage deviation.

23. A control method according to claim 22, further including:

- a step (225) for detecting a variation of an electrical load; and
- a step (226) for controlling a speed of changing a driving volume of said excitation coil when a variation of said electrical load has exceeded a predetermined value.

24. A control method according to claim 23, wherein said step for detecting a variation of an electrical load includes a step for detecting a variation of a voltage of said battery.

25. A control method according to claim 23, wherein said step for limiting a speed of changing a driving volume of said excitation coil includes a step for setting a speed of increasing a driving volume of said excitation coil to be smaller than a maximum speed of decreasing a driving volume of said excitation coil.

26. A control method according to claim 23, wherein said step for limiting a speed of increasing a driving volume of said excitation coil includes, when an intake air quantity has been set to zero by said intake air quantity adjusting means:

- a step for setting a limit value of a speed of changing a driving volume of said excitation coil to a first value when a rotation number of said internal combustion engine is higher than a predetermined value;
- a step for setting a limit value of a speed of changing a driving volume of said excitation coil to a second value when a rotation number of said internal combustion engine is not higher than a predetermined value and an electrical load exceeds a predetermined value; and
- a step for setting a limit value of a speed of changing a driving volume of said excitation coil to a third value when a rotation number of said internal combustion engine is not higher than a predetermined value and an electrical load is not higher than a predetermined value, where, said first value>said second value>said third value (FIG. 10).

27. In a control system for a vehicle generator, comprising: an internal combustion engine mounted on a vehicle; an operating unit for controlling a driving of said internal combustion engine; intake air quantity adjusting means for adjusting a quantity of an intake air during an idling; a generator driven by said internal combustion engine, for generating power; an excitation coil incorporated in said generator, for controlling a generation volume; and a battery to be charged by power generated by said generator, a method for controlling a vehicle generator (FIG. 10), including:

- a step of setting a limit value of a speed of changing a driving volume of said excitation coil to a first value when a rotation number of said internal combustion engine is higher than a predetermined value;
- a step for setting a limit value of a speed of changing a driving volume of said excitation coil to a second value when a rotation number of said internal combustion engine is not higher than a predetermined value and an electrical load exceeds a predetermined value; and
- a step for setting a limit value of a speed of changing a driving volume of said excitation coil to a third value when a rotation number of said internal combustion engine is not higher than a predetermined value and an electrical load is not higher than a predetermined value, where, said first value>said second value>said third value.

28. A method for controlling a vehicle generator, including:

- a step (209) for obtaining a first correction volume of an opening of an ISC valve based on a deviation of a rotation number of an internal combustion engine from a target rotation number;
- a step (224) for obtaining a driving volume of an excitation coil of a generator based on a deviation of a battery voltage from a target voltage;
- a step (210) for obtaining a second correction volume of an opening of said ISC valve based on a driving volume of said excitation coil and a rotation number of said internal combustion engine; and
- a step (211) for obtaining a driving volume of said ISC valve from said first and second correction volumes of an opening of said ISC valve.

\* \* \* \* \*